United States Patent [19]
Courmier

[11] Patent Number: 6,132,151
[45] Date of Patent: Oct. 17, 2000

[54] DEVICE FOR STABILIZING WORKSTOCK ON A BROACH TOOL GUIDE SLEEVE

[76] Inventor: Jerry W. Courmier, 8103 Hwy. 394, DeRidder, La. 70634

[21] Appl. No.: 09/233,372

[22] Filed: Jan. 19, 1999

[51] Int. Cl.$^7$ ................................................. B23D 37/00
[52] U.S. Cl. ........................... 409/259; 409/304; 409/307
[58] Field of Search .................................. 409/304, 307, 409/299, 274, 257, 277, 279, 259

[56] References Cited

U.S. PATENT DOCUMENTS

| | | | |
|---|---|---|---|
| 131,293 | 9/1872 | Mooney | 409/304 |
| 430,133 | 6/1890 | Little . | |
| 518,023 | 4/1894 | Davis | 409/307 |
| 722,222 | 3/1903 | Fuhrmann . | |
| 870,971 | 11/1907 | Lindstrom . | |
| 958,081 | 5/1910 | Billing | 409/307 |
| 2,534,759 | 12/1950 | Dulli | 409/307 X |
| 4,284,377 | 8/1981 | Piper | 409/259 |
| 5,150,996 | 9/1992 | Thoroughman | 409/259 |

*Primary Examiner*—William Briggs
*Attorney, Agent, or Firm*—John M. Harrison

[57] ABSTRACT

A device for stabilizing a workstock in a slotted broach tool guide sleeve while a key broach tool extending through the guide sleeve cuts a key slot in the annular bore wall of the workstock. In a preferred embodiment the device is characterized by a pair of top and bottom end plates, each provided with a semicircular notch for receiving the cylindrical guide sleeve at opposite ends of the workstock, after the workstock is positioned on the guide sleeve. Each end plate includes a beveled surface which engages the corresponding open end of the workstock and a plate mount bolt is extended through the end plates and the workstock bore and a nut is threaded on each end of the bolt to secure the end plates against the workstock. The guide sleeve with the assembled device is oriented in a vertical position, with the lower end of the guide sleeve typically secured between the adjacent support plates of a work bench or table and the bottom end plate resting on the work table. As a hydraulic press is operated to extend the key broach tool downwardly through the guide sleeve and workstock to cut a keyway in the annular bore wall of the workstock, the end plates assembled on the guide sleeve prevent lateral displacement of the workstock on the guide sleeve and stabilize the workstock against the cutting edge of the key broach tool. A semicircular keeper can be placed on the work table in engagement with the guide sleeve for stabilizing the key broach tool in the guide sleeve.

11 Claims, 4 Drawing Sheets

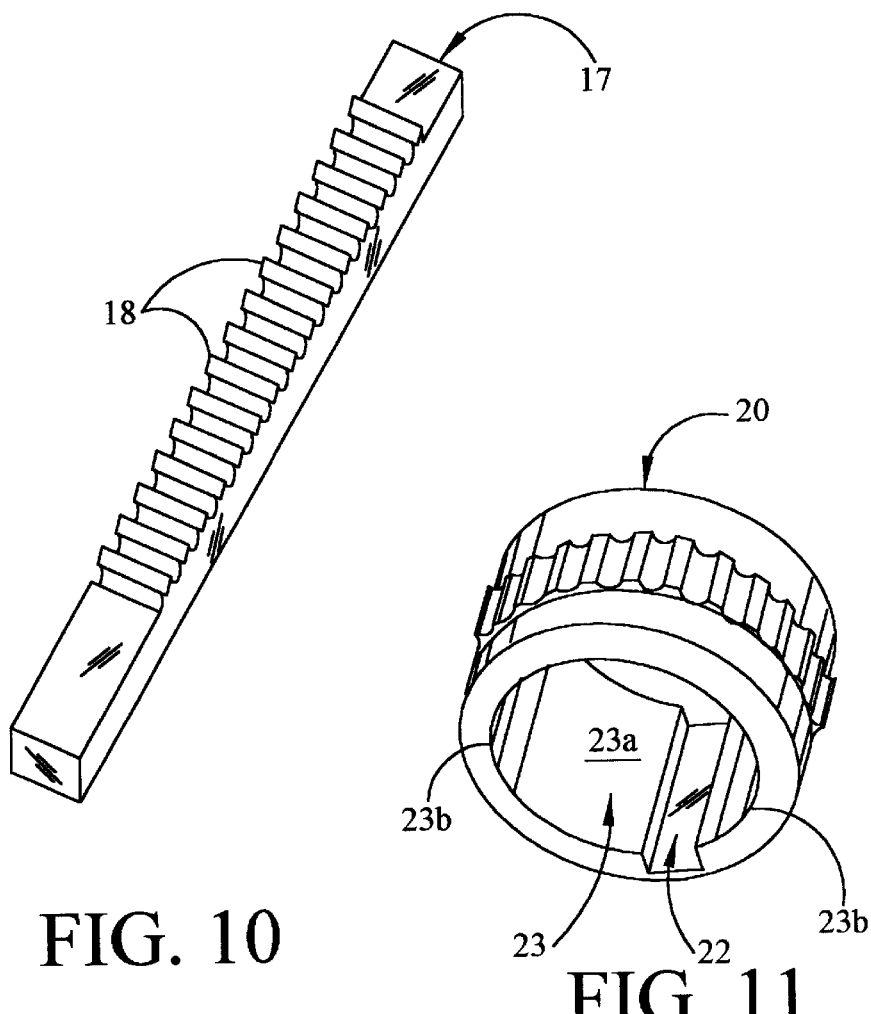
FIG. 10
FIG. 11
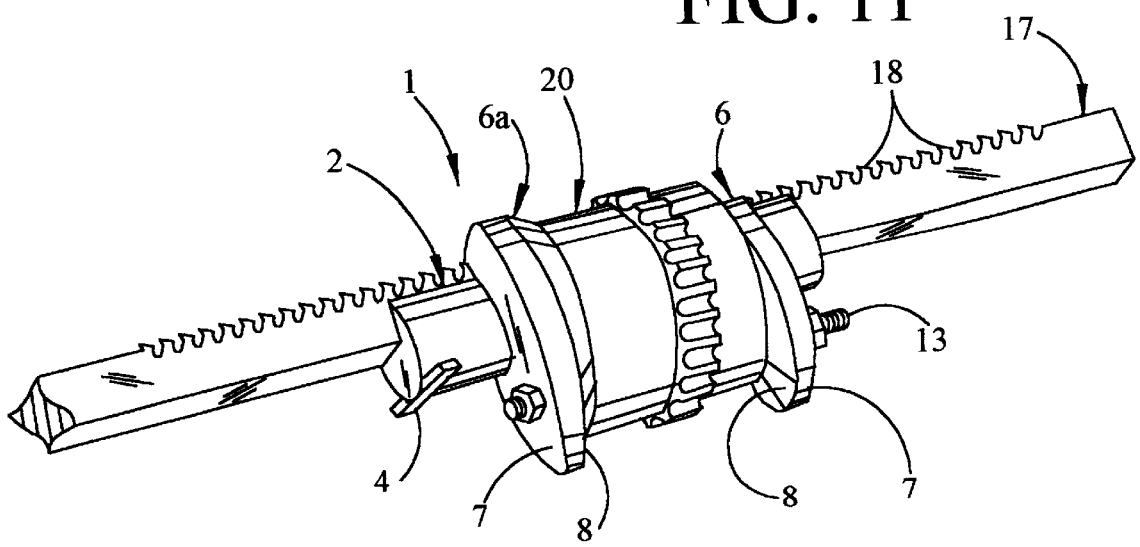
FIG. 12

DEVICE FOR STABILIZING WORKSTOCK ON A BROACH TOOL GUIDE SLEEVE

BACKGROUND OF THE INVENTION

1. Field of the Invention

This invention relates to key broach tools for cutting keyways in a workstock and more particularly, to a device for stabilizing a workstock on a broach tool guide sleeve while a key broach tool extending through the guide sleeve cuts a keyslot in the annular bore wall of the workstock, typically by operation of a hydraulic press. In a preferred embodiment the device is characterized by a pair of top and bottom end plates, each provided with a semicircular notch for receiving the cylindrical guide sleeve at opposite ends of the workstock after the workstock is positioned on the guide sleeve. Each end plate includes a bevelled surface for engaging the corresponding open end of the workstock. A bolt is extended through the end plates and the bore of the workstock and nuts are threaded on the opposite ends of the bolt to secure the end plates against the workstock. In typical application of the device the lower end of the guide sleeve with the assembled device is secured between the adjacent support panels or plates of a work table, with the bottom end plate resting on the plates or panels of the work table and the key broach tool is extended downwardly through the slotted guide sleeve and workstock by operation of a hydraulic press. As the key broach tool cuts the key slot in the annular bore wall of the workstock, the end plates on the slotted guide sleeve prevent lateral displacement of the workstock on the guide sleeve and secure the workstock against the cutting edge of the key broach tool. A semicircular keeper can be positioned on the work table engaging the slotted sleeve for stabilizing the key broach tool in the guide sleeve.

To facilitate cutting a keyway linearly in the annular bore wall of a cylindrical workstock such as a hub collar or sleeve, for example, a slotted broach tool guide sleeve or bushing, upon which the workstock is positioned, is typically used to support and guide a key broach tool through the workstock bore as a hydraulic press extends the vertical key broach tool downwardly through the workstock to cut the keyway in the workstock. Standard or conventional broach tool guide sleeves are characterized by an elongated, slotted sleeve having a selected length and diameter and which is secured in a vertical position between the adjacent support panels or plates or a work table or bench and initially receives the cylindrical workstock. A vertical key broach tool is positioned in the longitudinal slot of the secured guide sleeve and a hydraulic press extends the key broach tool downwardly through the guide sleeve and workstock, to cut the key slot in the workstock. Due to the horizontal pressure exerted by the key broach tool against the interior bore wall of the workstock, the workstock has a tendency to become laterally displaced if it is not firmly secured on the guide sleeve. Accordingly, the device of this invention provides a mechanism for stabilizing a workstock on a slotted guide sleeve and against the cutting edge or teeth of a key broach tool extending through the guide sleeve in order to prevent displacement of the workstock on the guide sleeve and facilitate more precise cutting of the key slot in the workstock.

2. Description of the Prior Art

Several devices are known in the art for securing a workstock in a position which facilitates cutting a key slot in the workstock. U.S. Pat. No. 430,133, dated Jun. 17, 1890, to Addison M. Little, describes a "Mandrel For Key Seat Cutting Machines" designed to cut a key slot in the interior hub bore wall of a wheel hub while the wheel rests on a work surface. A key is initially extended downwardly through the wheel hub bore and into the work surface to secure the hub to the work surface. The mandrel reciprocates in the wheel hub adjacent to the key to cut a key slot in the annular bore wall of the hub. A rectangular bar can be inserted in the hub bore between the key and the mandrel, as needed, in order to maintain a tight fit of the mandrel against the hub bore wall. U.S. Pat. No. 722,222, dated Mar. 10, 1903, to John T. Fuhrmann, discloses a "Valve Dressing Tool" for dressing valve seats. The valve seat to be dressed is initially bolted to a mandrel guiding plate, and the valve dressing tool is next extended through the mandrel guiding plate and reciprocated in the secured valve seat to dress the annular interior of the valve seat. A "Device For Cutting Key Seats or the Like" is disclosed in U.S. Pat. No. 870,971, dated Nov. 12, 1907, to Conrad Lindstrom. The Lindstrom device is characterized by a slotted chisel guide sleeve which is clamped against a workstock in which a keyslot is to be chiseled, with the slot of the guide sleeve facing the workstock. A slideway is provided in the other side of the guide sleeve for receiving a tapered key between the clamp and the sleeve, to achieve a selected tight fit of the sleeve against the workstock. A hand chisel is impelled by the strokes of a hammer or mallet in the guide sleeve slot to facilitate cutting a key slot in the workstock. U.S. Pat. No. 4,284,377, dated Aug. 18, 1981, to Bert W. Piper, describes a "Portable Key Seat Cutter" including a shank on which a pulley is adapted to be clamped. A broach tool blade is slidably disposed in a groove provided in the shank and extends through a bore in the pulley. The key seat is cut in the pulley bore by manually pivoting a handle to effect repeated strokes of the broach tool blade. The depth of the cut is progessively increased to the desired depth of the slot between successive strokes of the blade by incremental advancement of a tapered feed bar in the groove on the shank on which the broach tool blade is slidably mounted. A "Keyway Broach Guide Assembly" is detailed in U.S. Pat. No. 5,150,996, dated Sep. 29, 1992, to Glenn R. Thoroughman. The broach guide assembly includes a tapered wedge and a broach tool guide member which is positioned in longitudinally-abutting relationship to the tapered wedge to form a broaching bushing of substantially rectangular cross-section for insertion in the bore of a workstock. The width of the broach guide assembly is adjusted to fit tightly in the workstock bore by longitudinal shifting of the tapered wedge and guide member relative to each other.

An object of this invention is to provide a device for stabilizing a workstock on a slotted broach tool guide sleeve while a key broach tool cuts a key slot in the workstock.

Another object of this invention is to provide a device for stabilizing a cylindrical workstock on a slotted broach tool guide sleeve while a key broach tool cuts a key slot in the annular bore wall of the workstock.

Still another object of this invention is to provide a device for stabilizing a workstock on a slotted broach tool guide sleeve while a key broach tool cuts a key slot in the annular bore wall of the workstock, which device in a preferred embodiment is characterized by a pair of end plates which receive the broach tool guide sleeve and engage respective ends of the cylindrical workstock positioned on the guide sleeve and a bolt which is extended through the end plates and workstock and receives nuts on the ends of the bolt to secure the end plates against the cylindrical workstock and stabilize the workstock against the cutting edge of the key broach tool.

Yet another object of this invention is to provide a device for stabilizing a cylindrical workstock on a broach tool guide sleeve while a key broach tool extending through the guide sleeve cuts a key slot in the annular bore wall of the workstock, which device is characterized by a pair of end plates, each having a sleeve notch for receiving the cylindrical guide sleeve and a bevelled surface for engaging the corresponding end of the cylindrical workstock, and a bolt which is extended through the spaced end plates and the bore of the workstock and receives nuts on the respective ends of the bolt to secure the end plates against the workstock, which end plates prevent lateral displacement of the workstock on the guide sleeve and stabilize the workstock against the cutting edge of the key broach tool as the key broach tool cuts a key slot in the workstock by operation of a hydraulic press.

SUMMARY OF THE INVENTION

These and other objects of the invention are provided in a device for stabilizing a cylindrical workstock having a longitudinal bore, on a slotted broach tool guide sleeve and against the cutting edge of a key broach tool while the key broach tool extending through the guide sleeve cuts a key slot in the annular bore wall of the workstock. In a preferred embodiment the device is characterized by a pair of top and bottom end plates, each shaped with a guide sleeve notch for receiving the cylindrical guide sleeve after the workstock is positioned on the guide sleeve, each end plate also having a bevelled surface for engaging the corresponding open end of the workstock. A bolt is extended through the end plates and the workstock bore and receives a nut on each end of the bolt to secure the end plates against the workstock. After the lower end of the guide sleeve is secured between the adjacent support panels or plates of a work table or bench with the bottom end plate of the assembled device on the vertical guide sleeve resting on the work table, the end plates prevent lateral displacement of the workstock on the guide sleeve and secure the workstock against the cutting edge of the key broach tool as the key broach tool is extended downwardly through the slotted guide sleeve and cuts a key slot in the annular interior bore wall of the cylindrical workstock, typically by operation of a hydraulic press. A semicircular keeper can be positioned on the work surface engaging the slotted sleeve for stabilizing the key broach tool in the guide sleeve.

BRIEF DESCRIPTION OF THE DRAWINGS

The invention will be better understood by reference to the accompanying drawings, wherein:

FIG. 10 is a perspective view of a standard or conventional key broach tool;

FIG. 11 is a perspective view of an illustrative cylindrical workstock having a longitudinal bore;

FIG. 12 is a rear perspective view of the device of this invention, assembled on a broach tool guide sleeve, with a key broach tool extending through the guide sleeve and through the bore of a workstock positioned on the guide sleeve and secured between the end plates of the device, preparatory to cutting a key slot in the annular bore wall of the workstock;

DESCRIPTION OF THE PREFERRED EMBODIMENTS

Figure 1:
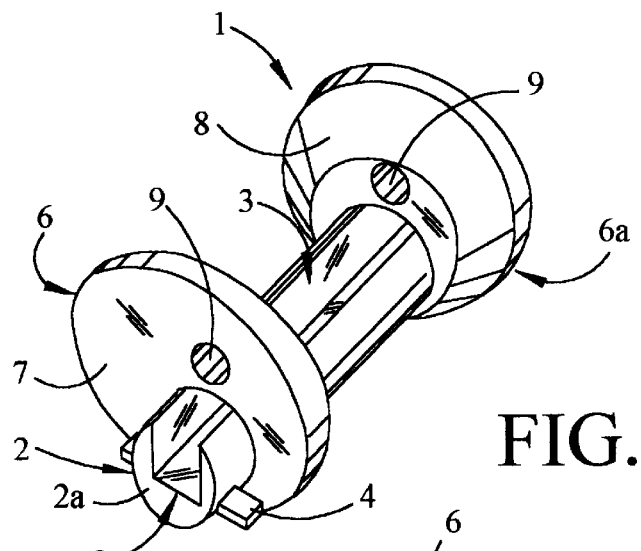
FIG. 1 is a perspective view of a standard or conventional, slotted broach tool guide sleeve, with the end plate components of the device of this invention positioned on the guide sleeve in spaced-apart relationship with respect to each other and the broach slot rotated 180-degrees for purposes of illustration.
Figure 2:
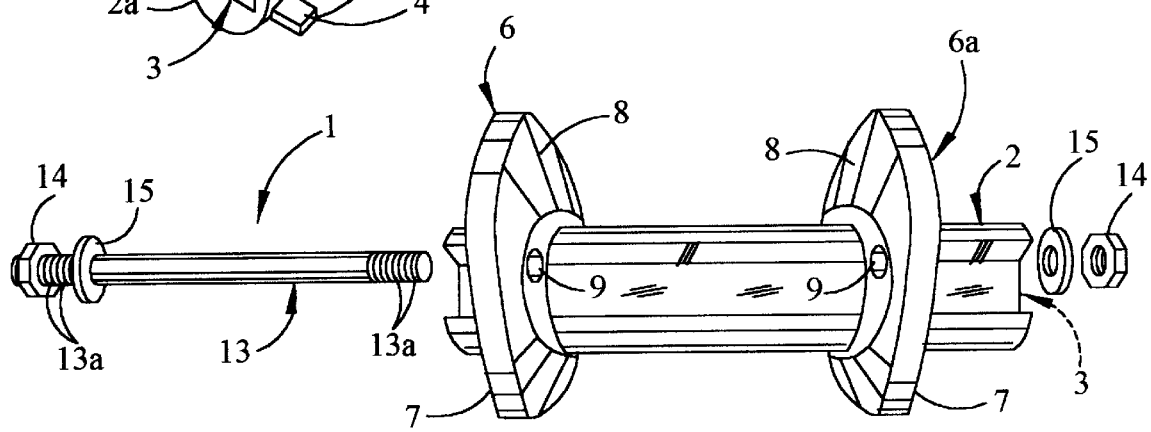
FIG. 2 is a rear view of the guide sleeve illustrated in FIG. 1, more particularly illustrating a bolt technique for securing the end plates against a cylindrical workstock (not shown) positioned on the guide sleeve between the end plates.
Figure 3:
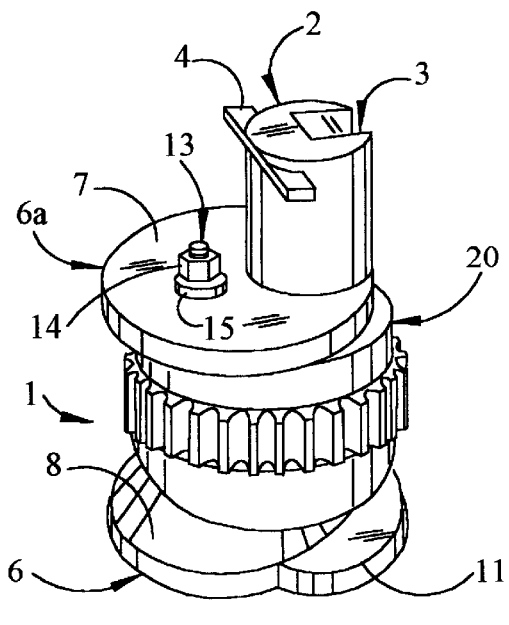
FIG. 3 is a perspective view of the assembled device of this invention, with an illustrative cylindrical workstock positioned on the guide sleeve and secured between the end plates of the device.
Figure 4:
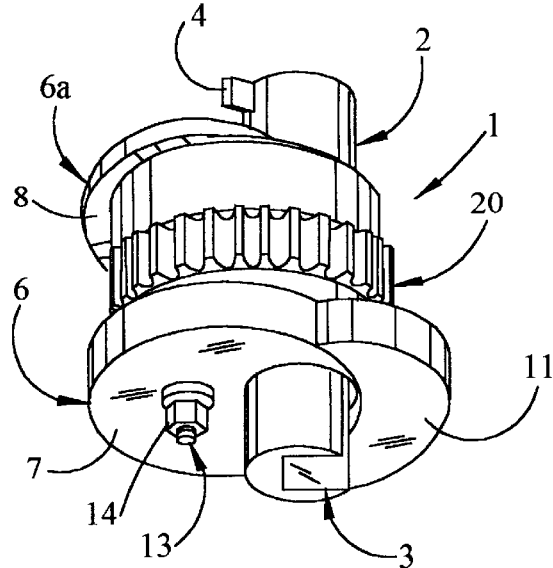
FIG. 4 is a bottom perspective view of the assembled device and guide sleeve illustrated in FIG. 3.
Figure 5:
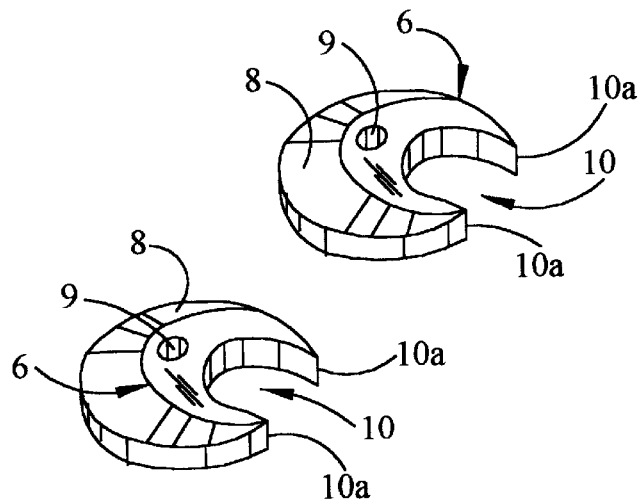
FIG. 5 is a perspective view of the bevelled surface of an end plate component of the device.
Figure 6:
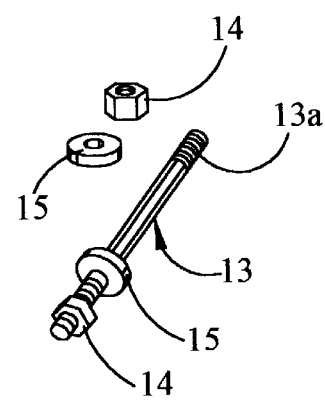
FIG. 6 is a perspective view of a plate mount bolt component of the device of this invention, used to secure the end plate components of the device against the cylindrical workstock positioned on the slotted guide sleeve.
Figure 7:
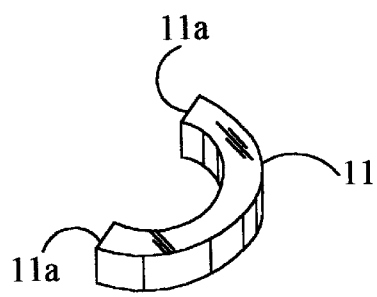
FIG. 7 is a perspective view of the keeper component of the device.
Figure 8:
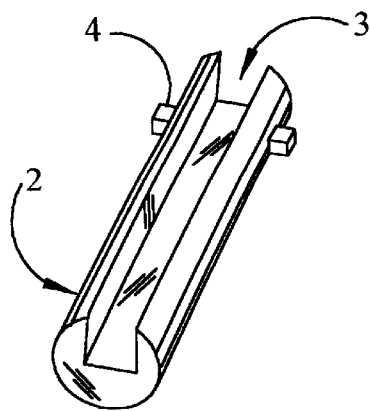
FIG. 8 is a perspective view of a standard or conventional, slotted broach tool guide sleeve.
Figure 9:
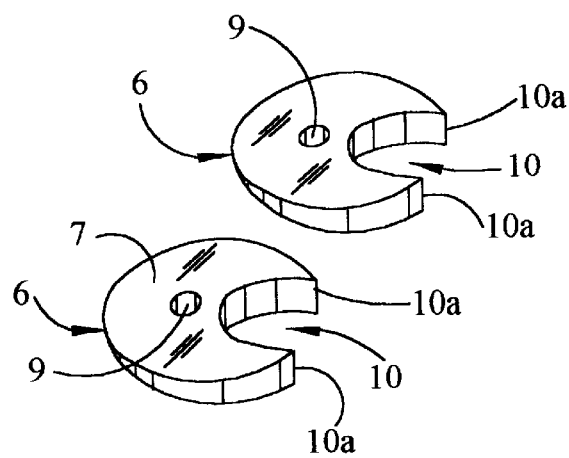
FIG. 9 is a perspective view of the flat surface of the end plate component of the device illustrated in FIG. 5.

Referring initially to FIGS. 1–12 of the drawings, in a preferred embodiment the device for stabilizing a workstock on a broach tool guide sleeve, hereinafter referred to as the device, of this invention is generally illustrated by reference numeral 1. The device 1 is assembled on a standard or conventional broach tool guide sleeve 2 (FIGS. 1, 2 and 8) to stabilize a cylindrical workstock 20 (FIG. 11) on the broach tool guide sleeve 2 as a key broach tool 17, (FIG. 10) extending through the broach slot 3 provided in the broach tool guide sleeve 2, (FIG. 12) is operated on a hydraulic press (not illustrated) to cut a key slot 22 in the annular bore wall 23a of the workstock 20, as illustrated in FIG. 11 and hereinafter further described. In a preferred embodiment the device 1 includes a rounded top end plate 6 and a like bottom end plate 6a (FIG. 12), each of which includes a semicircular guide sleeve notch 10 (FIG. 5) for receiving the cylindrical broach tool guide sleeve 2 on the corresponding side of a cylindrical workstock 20, positioned on the broach tool guide sleeve 2 as illustrated in FIGS. 3 and 4 and hereinafter further described. The top end plate 6 and bottom end plate 6a are positioned on the broach tool guide sleeve 2 in such a manner that the notch edges 10a of the top end plate 6 and bottom end plate 6a remain clear of the longitudinal broach slot 3 provided in the broach tool guide sleeve 2, as illustrated in FIG. 1. Additionally, the bottom end plate 6a is positioned in spaced-apart relationship with respect to a sleeve flange 4, provided on the bottom end 2a of the broach tool guide sleeve 2. Each end plate 6 further includes a bevelled surface 8 (FIG. 5) for engaging the bore edge 23b (FIG. 11) at the corresponding open end of the cylindrical workstock 20, as illustrated in FIGS. 3 and 4. An elongated bolt 13, provided with bolt threads 13a at each end thereof (FIG. 6) is extended through aligned bolt openings 9 provided in the respective, spaced top end plate 6 and bottom end plate 6a, as further illustrated in FIG. 2, and through the workstock bore 23 of the workstock 20. A washer 15 is typically placed on each end of the bolt 13 and nuts 14 are threaded on the bolt threads 13a and tightened to compress each washer 15 against the flat surface 7 of the corresponding top end plate 6 and bottom end plate 6a, and secure the top end plate 6 and bottom end plate 6a tightly against the workstock 20. Because the bevelled surface 8 of the top end plate 6 and bottom end plate 6a firmly engages the interior bore edge 23b (FIG. 11) at the corresponding end of the workstock 20, the workstock 20 is firmly secured between the top end plate 6 and bottom end plate 6a, and lateral displacement of the workstock 20 with respect to the broach tool guide sleeve 2 is prevented.

Figure 13:
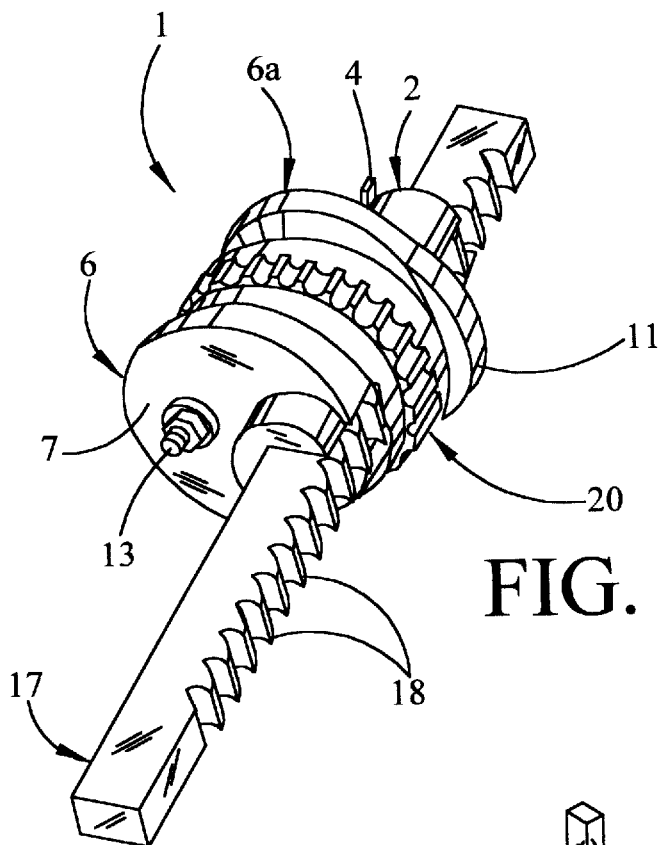
FIG. 13 is a front perspective view of the assembled device illustrated in FIG. 12.
Figure 14:
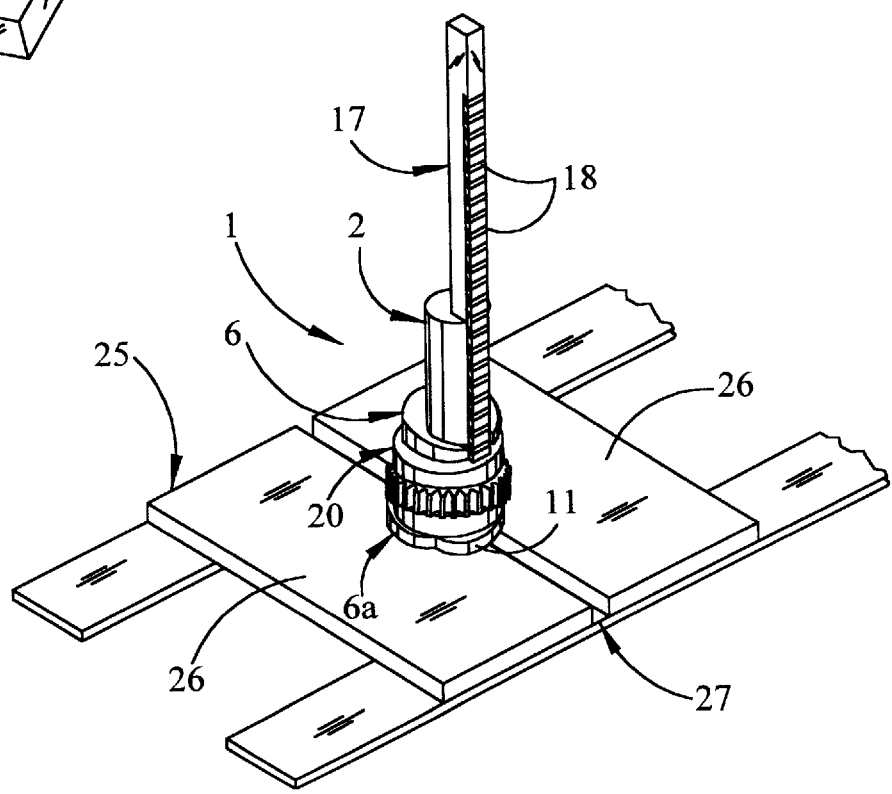
FIG. 14 is a perspective view of the device, assembled on a broach tool guide sleeve with the guide sleeve secured in functional configuration between the support plates of a work table or bench.

Referring next to FIGS. 12–14 of the drawings, in typical application of the device 1 the workstock 20 is initially positioned on the broach tool guide sleeve 2 by extending the broach tool guide sleeve 2 through the workstock bore 23 of the workstock 20. After the top end plate 6 and bottom end plate 6a of the device 1 are assembled on the guide sleeve 2 and secured against the workstock 20 using the bolt 13, washers 15 and nuts 14 as heretofore described, the sleeve flange 4 at the bottom end 2a of the vertical broach tool guide sleeve 2 is secured between the adjacent support plates 26 of a work table or bench 25, with the flat surface 7 of the bottom end plate 6a resting on the support plates 26 of the work table or bench 25. The upper end of a standard or conventional key broach tool 17, provided with multiple broach teeth 18, is secured in a hydraulic press (not illustrated) in conventional fashion and the bottom end of the key broach tool 17 is extended downwardly through the broach slot 3 of the broach tool guide sleeve 2 and thus through the bore 23 of the workstock 20. As illustrated in FIG. 14, the multiple broach teeth 18 of the broach tool 17 contact the inner bore wall 23a of the workstock 20 (FIG. 11) and as the hydraulic press (not illustrated) forces the key broach tool 17 downwardly, the broach teeth 18 cut a key slot 22 in the bore wall 23a of the workstock 20. Accordingly, as the key broach tool 17 exerts horizontal pressure against the workstock 20 in the direction indicated by the arrow in FIG. 13, the bevelled ends 8 of the respective top end plate 6 and bottom end plate 6a prevent lateral displacement of the workstock 20 on the broach tool guide sleeve 2 and secure the bore wall 23a of the workstock 20 against the broach teeth 18 of the key broach tool 17. Continued operation of the hydraulic press extends the key broach tool 17 downwardly through the broach tool guide sleeve 2 and workstock 20 as the broach teeth 18 contact the bore wall 23a of the workstock 20. The key broach tool 17 can then be raised by the hydraulic press and again extended downwardly through the broach tool guide sleeve 2 and workstock 20, as desired, to facilitate cutting a desired depth of the key slot 22 in the workstock bore wall 23.

Referring next to FIGS. 3, 4, 7, 13 and 14 of the drawings, a semicircular keeper 11 can be placed on the parallel support plates 26 of the work table 25 to stabilize the key broach tool 17 in the longitudinal broach slot 3 of the broach tool guide sleeve 2 under circumstances where no flange is present on the base of the workstock 20. The keeper 11 spans the plate space 27 between the support plates 26 and receives the workstock 20 with the keeper ends 11a engaging the bottom end plate 6a. The keeper 11 is maintained in working position between the workstock 20 and the support plates 26 by the force applied to the key broach tool 17 by the hydraulic press (not illustrated).

It will be appreciated by those skilled in the art that the device 1 of this invention provides a simple and yet effective mechanism for stabilizing a workstock on a broach tool guide sleeve and against the cutting edge of a broach tool as the broach tool is used to cut a key slot of selected depth in the annular bore wall of the workstock. Referring again to FIGS. 5 and 9 of the drawings, it will be further appreciated by those skilled in the art that the guide sleeve notch 10 of each end plate 6 can be sized and configured to match the contour of a broach tool guide sleeve having a selected diameter. Moreover, the contour of the bevelled surface 8 provided on each end plate 6 facilitates a tight fit of each end plate 6 against the bore edge 23b of workstock 20 having various diameter.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. A device for stabilizing a workstock on a slotted broach tool guide sleeve while a key broach tool cuts a key slot in the annular bore wall of the workstock, said device comprising a first end plate having a first guide sleeve notch for receiving the guide sleeve; a first bevelled surface provided on said first end plate for engaging one end of the workstock; a second end plate having a second guide sleeve notch for receiving the guide sleeve; a second bevelled surface provided on said second end plate for engaging the other end of the workstock; and a mounting mechanism for engaging said first end plate and said second end plate to secure said first end plate and said second end plate against the workstock.

2. The device of claim 1 wherein said mounting means comprises a plate mount bolt for extension through said first end plate and said second end plate, a first nut for threading on one end of said plate mount bolt and a second nut for threading on the other end of said plate mount bolt.

3. The device of claim 1 comprising a keeper for engaging the guide sleeve and stabilizing the key broach tool in the guide sleeve.

4. The device of claim 1 wherein said mounting mechanism comprises a plate mount bolt for extension through said first end plate and said second end plate, a first nut for threading on one end of said plate mount bolt and a second nut for threading on the other end of said plate mount bolt and comprising a keeper for engaging the guide sleeve and stabilizing the key broach tool in the guide sleeve.

5. A device for stabilizing a workstock on a slotted broach tool guide sleeve while a key broach tool cuts a key slot in the workstock, said device comprising a first end plate for receiving the guide sleeve and engaging one end of the workstock; a second end plate for receiving the guide sleeve and engaging the other end of the workstock, each of said first end plate and said second end plate including a beveled surface for engaging respective ends of the workstock; and a mounting mechanism for engaging said first end plate and said second end plate and securing said first end plate and said second end plate against the workstock.

6. The device of claim 5 comprising a keeper for engaging the guide sleeve and stabilizing the key broach tool in the guide sleeve.

7. The device of claim 5 wherein said mounting mechanism comprises a plate mount bolt for extension through said first end plate and said second end plate, a first nut for threading on one end of said plate mount bolt and a second nut for threading on the other end of said plate mount bolt.

8. The device of claim 5 comprising a keeper for engaging the guide sleeve and stabilizing the key broach tool in the guide sleeve and said mounting mechanism comprises a plate mount bolt for extension through said first end plate and said second end plate, a first nut for threading on one end of said plate mount bolt and a second nut for threading on the other end of said plate mount bolt.

9. A device for stabilizing a workstock on a slotted broach tool guide sleeve while a key broach tool cuts a key slot in the workstock, said device comprising a first end plate for receiving the guide sleeve and engaging one end of the workstock; a second end plate for receiving the guide sleeve and engaging the other end of the workstock, said first end plate and said second end plate each including a beveled surface for engaging respective ends of the workstock; a plate mount bolt for extension through said first end plate and said second end plate; a first nut for threading on one end of said plate mount bolt and a second nut for threading on the other end of said plate mount bolt; and a substantially semicircular keeper for engaging the guide sleeve and stabilizing the key broach tool in the guide sleeve.

10. A device for stabilizing a workstock on a slotted broach tool guide sleeve resting on a work surface while a key broach tool cuts a key slot in the annular bore wall of the workstock, said device comprising a first end plate having a first guide sleeve notch for receiving the guide sleeve; a first bevelled surface provided on said first end plate for engaging one end of the workstock; a second end plate having a second guide sleeve notch for receiving the guide sleeve; a second bevelled surface provided on said second end plate for engaging the other end of the workstock; a plate mount bolt for extension through said first end plate and said second end plate, a first nut for threading on one end of said plate mount bolt and a second nut for threading on the other end of said plate mount bolt; and a substantially semicircular keeper for engaging the guide sleeve and stabilizing the key broach tool in the guide sleeve.

11. The device of claim 10 comprising a first washer engaging said plate mount bolt, said first nut and said first end plate and a second washer engaging said plate mount bolt, said second nut and said second end plate for securing said first end plate and said second end plate on the workstock.

* * * * *